United States Patent [19]

Sevcik

[11] 3,931,505

[45] Jan. 6, 1976

[54] PROGRAM CONTROLLED DATA PROCESSOR

[75] Inventor: Richard Walter Sevcik, Downers Grove, Ill.

[73] Assignee: Bell Telephone Laboratories, Incorporated, Murray Hill, N.J.

[22] Filed: Mar. 13, 1974

[21] Appl. No.: 450,896

[52] U.S. Cl. .................... 235/153 AE; 340/172.5
[51] Int. Cl.² ................ G06F 11/08; G06F 15/16
[58] Field of Search ........... 235/153 AE; 340/172.5

[56] References Cited
UNITED STATES PATENTS

| | | | |
|---|---|---|---|
| 3,303,474 | 2/1967 | Moore et al. | 340/172.5 |
| 3,471,686 | 10/1969 | Connell | 235/153 AE |
| 3,509,532 | 4/1970 | Mande Wege | 235/153 AE |
| 3,557,315 | 1/1971 | Kibus et al. | 235/153 AE |
| 3,651,480 | 3/1972 | Downing et al. | 340/172.5 |
| 3,651,482 | 3/1972 | Benson | 340/172.5 |
| 3,770,948 | 11/1973 | Caputo et al. | 235/153 AE |
| 3,810,119 | 5/1974 | Zieve et al. | 235/153 AE |

*Primary Examiner*—Charles E. Atkinson
*Attorney, Agent, or Firm*—K. H. Samples; J. C. Albrecht

[57] ABSTRACT

A program controlled data processing system which includes two data manipulation units generally operated in parallel. The two data manipulation units, however, by design react differently in the execution of certain program order words. The system includes a circuit arrangement which compares data generated by the two data manipulation units and generates comparison signals indicating the identity or lack of identity of the compared data. The comparison signals are utilized in the detection of faults and errors and in the determination of conditions as defined by the program.

8 Claims, 6 Drawing Figures

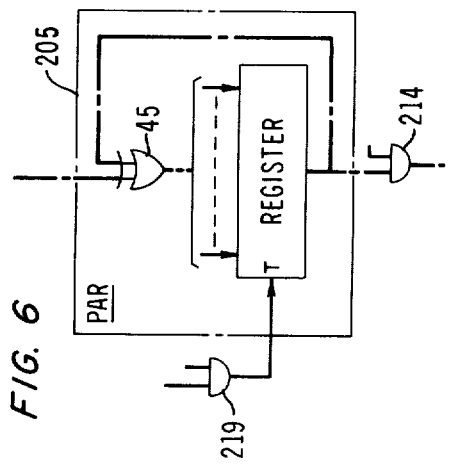
FIG. 4
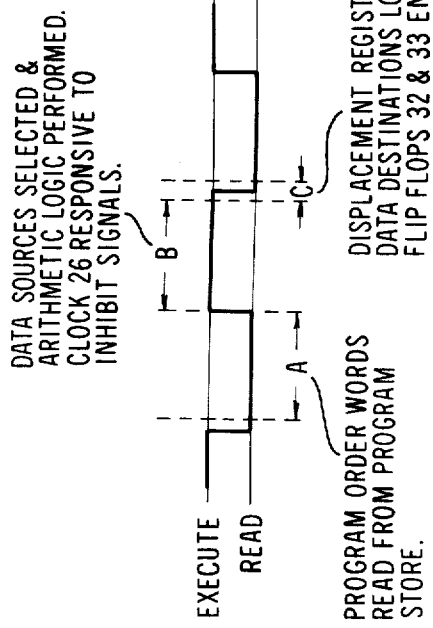
FIG. 6
FIG. 5
FIG. 3
| FIG. 1 |
| --- |
| FIG. 2 |

PROGRAM CONTROLLED DATA PROCESSOR

BACKGROUND OF THE INVENTION

This invention relates to data processing systems which comprise a plurality of data manipulation units generally operating in parallel to detect system faults and errors.

FIELD OF THE INVENTION

The use of two or more data manipulation units which operate upon identical data in parallel in response to common program order words is known in the art. In such prior art systems all data manipulation units comprise identical hardware and react in a uniform manner when executing a common set of program order words. The comparison of both intermediate and end products of processing generated by the plurality of data processing units is a common technique in the detection of faults and errors. Where two units are operated in parallel a mismatch of an intermediate or end product is taken to represent a system error or fault, and where more than two units are in operation majority logic is utilized when there is a failure of agreement between the data generated by the various units. Such priorly known arrangements are effective to detect system errors and faults and in certain situations to continue data processing even in the presence of such faults and errors.

By their very nature the data manipulation units of such prior art arrangements react identically in the execution of each program order word applied in common to them. Thus nonidentical responses to program order words are not permitted.

It is an object of the present invention to reduce the complexity of the data manipulation units and to augment the data processing system's error and fault detection capability by arranging the data manipulation units to react in a nonidentical manner in the execution of common program order words.

SUMMARY OF THE INVENTION

A data processing system in accordance with the present invention comprises two data manipulation units which are arranged to react in nonidentical manners while operating in parallel in the execution of certain program order words.

BRIEF DESCRIPTION OF THE DRAWING

FIG. 4 is a representation of program order words executed by the data processing system of FIGS. 1 and 2;

FIG. 5 is a timing diagram; and

FIG. 6 is a detailed drawing of a register circuit located in the data processing system.

DETAILED DESCRIPTION

Figure 1:
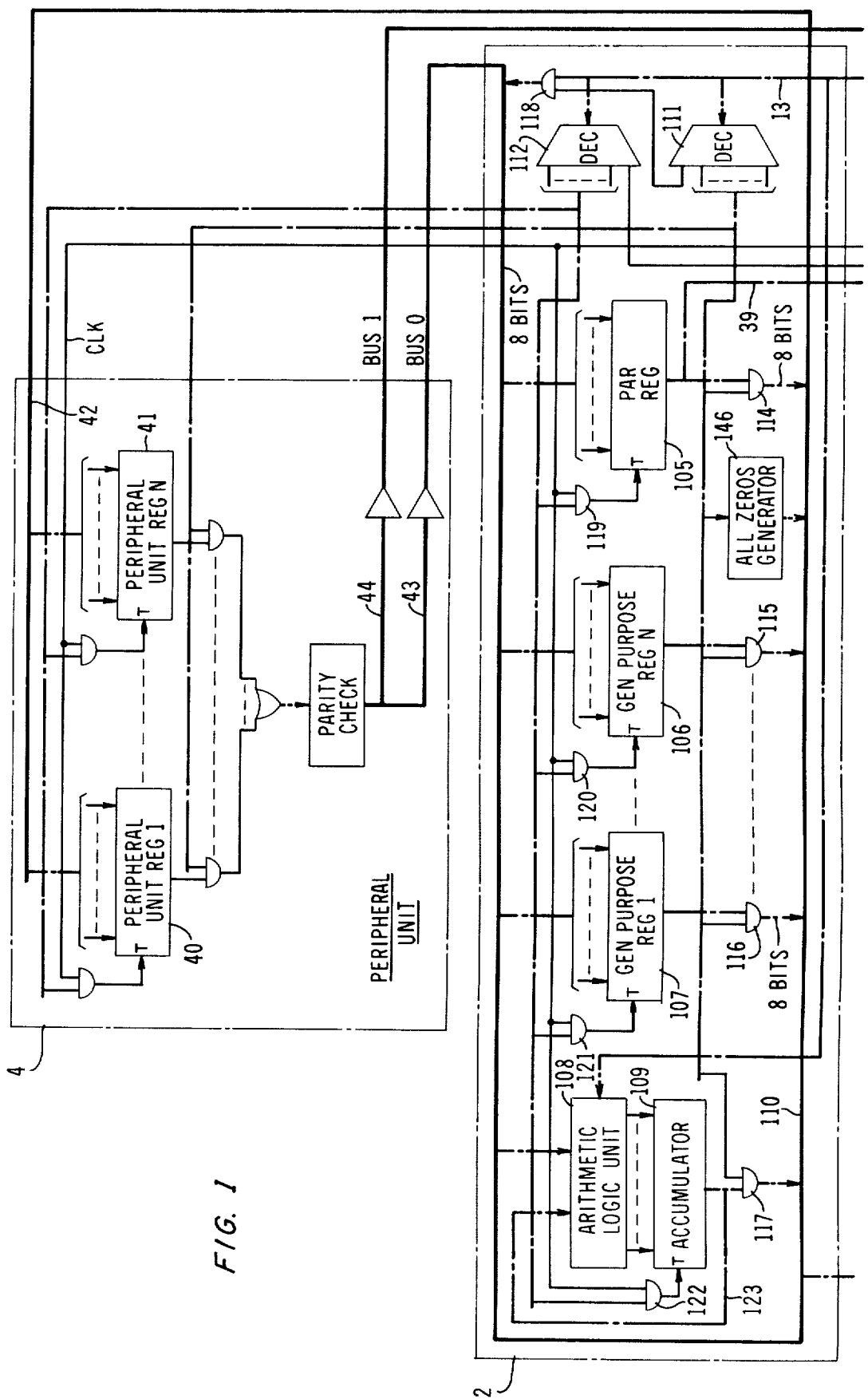
FIGS. 1 and 2, arranged and shown in FIG. 3, comprise a data processing system embodying the present invention.
Figure 2:
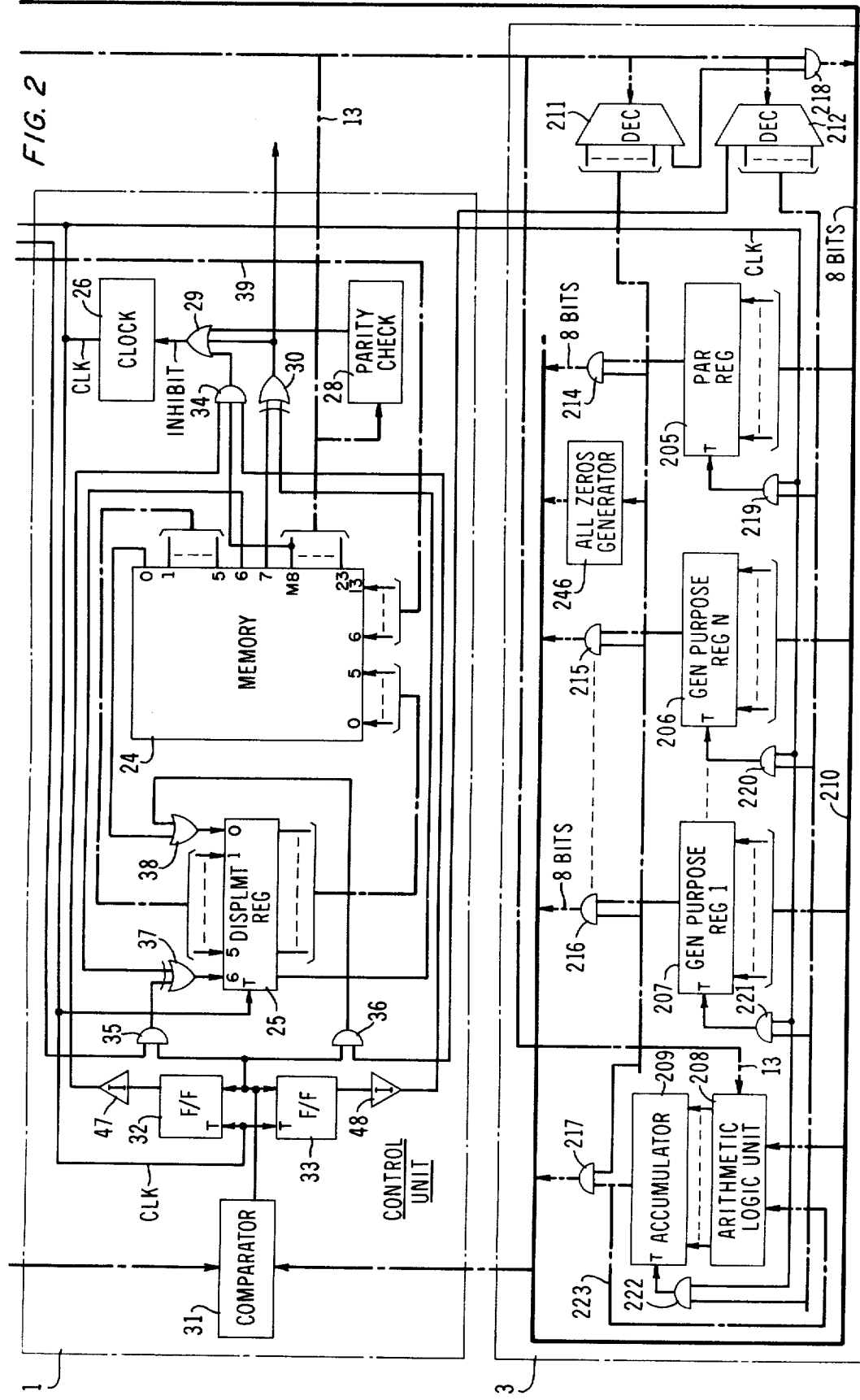

The data processing system embodying the present invention, shown in FIGS. 1 and 2, comprises a control unit 1, data manipulation units 2 and 3, and a peripheral unit 4. Data manipulation units 2 and 3 operate substantially in synchronism in response to program order words and clock signals from control unit 1 to produce signals for controlling peripheral unit 4. The general nature of peripheral unit 4 and its control are discussed in detail later herein.

In the drawing the components of data manipulation unit 2 are given reference numerals having a one in the hundreds place. The components of data manipulation unit 3 have a two in the hundreds place. Also, components which perform the same or related functions in data manipulation units 2 and 3 are assigned a reference numeral with the same tens and units place. By way of example, data manipulation unit 2 includes a general purpose register 106 which performs the same function as general purpose register 206 of data manipulation unit 3. Due to the similarity of data manipulation units 2 and 3 only the arrangement of data manipulation unit 2 is described herein in detail to aid in the understanding of the invention. However, when related components of data manipulation units 2 and 3 do not operate in the same manner their dissimilarities are described.

Data manipulation unit 2 includes a program address register 105 and a plurality of general purpose registers 106 and 107 for storing information. Data manipulation unit 2 also includes an arithmetic logic unit 108 and an accumulator 109 to enable the performance of arithmetic and logic operations on data. All of the registers store 8 bits of data.

Program address register 105, general purpose registers 106 and 107, and accumulator 109 are comprised of eight D-type flip-flops which respond to the falling edge of a signal applied to the clock input T to store the signal applied to their data inputs. The information stored by these D flip-flops cannot be altered until another falling edge signal is applied to the clock input T. In the present embodiment the transition from a logical 1 to a logical 0 constitutes a falling edge signal. A more detailed description of a D flip-flop which responds to a logical 1 to logical 0 transition at its clock input is located in G. Maley, *Manual of Logic Circuits*, page 251 (1970).

Clock signals which maintain synchronism in system operation are generated by a clock circuit 26 located in control unit 1. Control unit 1 also includes a memory 24 which stores program order words and data. Memory 24 is accessed by a 14-bit address, the generation of which is described below, to apply the program order word defined by that address to data manipulation units 2 and 3 via an order word bus 13. The output signals of memory 24 remain as DC conditions on order word bus 13 until the application of a new 14-bit address to memory 24 causes another program order word to be accessed.

Data is transmitted between register 105 through 107, the arithmetic logic unit 108, and accumulator 109 via an 8-bit data bus 110. The source and destination of data to be transmitted are selected by a source decoder 111 and a destination decoder 112, respectively. These selections are based on the program order words transmitted from control unit 1 to source decoder 111 and destination decoder 112 via order word bus 13. Source decoder 111 is a 1-out-of-*n* decoder which responds to program order words by applying a logical 1 to an output conductor defined by that program order word. Source decoder 111 selects the source of data for data bus 110 by applying logical 1 output signals to an appropriate AND gate in accordance with Table 1. It should be noted that a program order word on order word bus 13 can also be a source of data for both data manipulation units 2 and 3.

TABLE 1

| Data Source | AND Gate |
|---|---|
| Program Address Register 105 | 114 |
| General Purpose Register 106 | 115 |
| General Purpose Register 107 | 116 |
| Accumulator 109 | 117 |
| Order Word Bus 13 | 118 |

Although AND gates 114 through 118 are shown and referred to as individual gates each comprises eight AND gates operating in parallel. Additionally, data manipulation unit 2 includes an all zeros generator 146 which may be selected by source decoder 111 in response to program order words to place a zero on each bit position of data bus 110.

Destination decoder 112 is also a 1-out-of-n decoder responsive to program order words to apply a logical 1 to an output conductor defined by the program order word. Destination decoder 112 selects data destinations by applying its logical 1 output signal to an appropriate AND gate in accordance with Table 2.

TABLE 2

| Destination | AND Gate |
|---|---|
| Program Address Register 105 | 119 |
| General Purpose Register 106 | 120 |
| General Purpose Register 107 | 121 |

AND gates 119 through 121, upon receipt of a logical 1 from destination decoder 112, connect the signals from clock circuit 26 to the clock input T of their associated register. Due to the operation of the D flip-flops which make up each register, the register selected as a destination is not operative to store the data at its inputs until a logical 1 to logical 0 transition in the applied clock signals occurs. Additionally, destination decoder 112 can enable an AND gate 122 to transmit the signals from clock circuit 26 to the clock input T of accumulator 109. This causes the result of an arithmetic or logic operation from arithmetic logic unit 108 to be gated into accumulator 109 when the logical 1 to logical 0 transition in the clock signal occurs.

The program order words transmitted to the data manipulation unit 2 also control the particular arithmetic or logic function to be performed by the arithmetic logic unit 108. When a defined arithmetic or logic function requires only one operand, the contents of accumulator 109, which are applied directly to arithmetic logic unit 108 via a conductor 123, are employed as that operand. In situations where two operands are required, the contents of accumulator 109 are used as one operand and the data on data bus 110, as selected by source decoder 111, are used as the other operand. The corresponding output conductors of source decoder 111 and source decoder 211 are not all connected to control similar gating circuits. Similarly, the corresponding output conditions of destination decoders 112 and 212 are not all connected to control similar gating circuits. Thus, in response to some program order words nonidentical operations are performed in data manipulation units 2 and 3. Examples of such nonidentical operations are included later herein.

As previously stated, program order words are accessed from memory 24 in response to a 14-bit address. The high order 8 bits of each program store address are obtained from program address register 105 of data manipulation unit 2 via a conductor 39 and the low order 6 bits are obtained from a displacement register 25 located at control unit 1. It should be noted that the high order 8 bits come only from the program address register 105 of data manipulation unit 2 and not from data manipulation unit 3.

FIG. 4 shows the general arrangement of program order words. Bit positions 0 through 5 comprise a 6-bit displacement address which is used in a manner described later herein to form the contents of displacement register 25 and thereby the low order 6 bits of the address for subsequent memory accesses. Bit 6 is a parity predict bit intended to represent the parity of the next program store address. Bit 7 is a parity bit encoded from the address of the program order word which contains it. Bit 8 is employed to control the generation of inhibit signals based on the mismatch of data generated by data manipulation units 2 and 3. Bits 9 through 19, 22, and 23 comprise the data and operation code portion of the program order word. Bit position 20 and 21 and 23 comprise the data and operation code portion of the program order word. Bit positions 20 and 21 are parity bits encoded over the information contained in bit positions 8 through 19 of the program order word.

Signals generated by clock circuit 26 maintain synchronism in the operation of the system. FIG. 5 represents the output signals of clock circuit 26. Each machine cycle, defined by the clock signals, comprises a memory "read" cycle indicated by a logical 0 and an "execute" cycle indicated by a logical 1. During the read portion of a machine cycle a program order word is selected and applied to the outputs of memory 24. Such a program order word remains at the outputs of memory 24 during the execute cycle. Bit positions 0 through 6 of this program order word are employed in a manner described later herein to produce a portion of the next program store address. Bit positions 8 through 21 of the output program order word are applied to a parity check circuit 28 which compares parity bits 20 and 21 with the parity of bits 8 through 19 to detect parity errors in the program order word in a manner well known in the art. If such an error is detected, an inhibit signal is transmitted to clock circuit 26 via an OR gate 29.

The bits 9 through 19, 22, and 23 are directly coupled to source decoders 111 and 211, destination decoders 112 and 212, and the arithmetic logic units 108 and 208 of data manipulation units 2 and 3 via order word bus 13. Arithmetic logic units 108 and 208, source decoders 111 and 211, and destination decoders 112 and 212 respond to program order words when they are received which may occur before the execute cycle begins. The execute portion of a machine cycle is long enough so that data is applied to the data buses 110 and 210 and arithmetic and logic operations are performed on such data prior to the end of the execute cycle.

Source decoder 111 responds to program order words to enable a selected one of AND gates 114 through 118 causing the contents of the selected data source to be placed on data bus 110. Arithmetic logic unit 108 responds to program order words by performing a defined operation on the contents of accumulator 109 and, when so defined, on the information on data bus 110. Destination decoder 112 responds to program order words by enabling a selected one of AND gates 119 through 122. The data destination associated with the enabled AND gate does not immediately receive the information on data bus 110. Instead, it receives such information when the signals from clock circuit 26 which are coupled to the selected destination by the enabled AND gate change from the logical 1 execute to the logical 0 read portion of a machine cycle. More specifically, the selected data destination responds to the transition from the logical 1 execute portion of a machine cycle to the logical 0 read portion of the next machine cycle to receive the information on data bus 110. Additionally, displacement register 25, which is also comprised of edge triggered D flip-flops, responds to the logical 1 to logical 0 transition of the clock signal to store the signals at its inputs.

It must be noted that memory 24 is designed with input delay so that it does not change the program order word at its outputs until after the selected data destinations have received information. By the end of the read portion of a machine cycle, memory 24 has at its outputs the program order word located at the program store address indicated by the new contents of displacement register 25 which are based on bits 0 through 5 of the preceding order word, and the contents of program address register 105 of data manipulation unit 2.

As previously mentioned, bit position 6 of each program order word predicts the parity of the address of the next program order word while bit position 7 of each program order word indicates the parity of its own address. A parity check of memory addresses is performed during each machine cycle using this information. During the execute portion of a machine cycle bit 6 of displacement register 25, which is based on the parity predicting bit 6 of the preceding program order word, should predict the parity of the address of the program order word then applied to the outputs of memeory 24. Address parity is checked by applying bit 6 of displacement register 25 and the parity bit 7 of the output program order word to an Exclusive-OR circuit 30. If the two do not match, an inhibit signal is transmitted to clock circuit 26 via OR gate 29.

Clock circuit 26 responds to inhibit signals only during the execute portion of a machine cycle. When an inhibit signal is received by clock circuit 26 during the execute portion of a machine cycle the output signal of clock circuit 26 remains the logical 1 of an execute portion. In the absence of an inhibit signal, clock circuit 26 continues to operate.

Control unit 1 also includes an 8-bit comparator 31 which continuously compares the information on data buses 110 and 210 of data manipulation units 2 and 3, respectively, and generates a logical 0 output when the compared quantities are not identical and a logical 1 otherwise. The output signals of comparator 31 are applied to two edge triggered D flip-flops 32 and 33 which, in response to signals from clock circuit 26, assume the value of the output signals of comparator 31 at the time the clock signals change from the execute to the read portion of a machine cycle. Thus, if the comparator 31 is indicating a mismatch at the end of an execute cycle flip-flops 32 and 33 will store a logical 0.

Since each mismatch detected by comparator 31 is not necessarily an error it is necessary to distinguish, within control unit 1, a mismatch which indicates an error from a mismatch which does not. Bit 8 of each program order word controls the generation of clock inhibit signals in response to mismatch indications from comparator 31. The output signals of comparator 31 are delayed by flip-flops 32 and 33 so that bit 8 of any given program order word controls the generation of inhibit signals based on the mismatch of information generated by the preceding program order word. Bit 8 is a logical 1 when a mismatch of the contents of data buses 110 and 210, in response to the immediately preceding program order word, indicates an error and it is a logical 0 when such a mismatch is not to be considered an error.

The information contained by bit 8 of each program order word is determined when the program is prepared. Bit 8 of any given program order word is set to a logical 0 when the program order word which immediately precedes it defines that nonidentical operations are to be performed by data manipulation units 2 and 3. This is implemented by checking each program order word to determine if it defines nonidentical operations for data manipulation units 2 and 3. If the program order word being checked does define such nonidentical operation a logical 0 is placed in bit 8 of the program order word stored at the location given by bits 0 through 5 of the checked program order word. In all other situations bit position 8 is a logical 1.

The outputs of flip-flops 32 and 33 are complemented by a respective one of inverters 47 and 48 and applied as inputs to an AND gate 34. Bit 8 of the program order word presently at the output of memory 24 is also applied as an input to AND gate 34. When the complemented outputs of flip-flops 32 and 33 are logical 1s, indicating a mismatch, and bit position 8 of the program order word is also a logical 1, AND gate 34 applies a logical 1 inhibit signal to clock circuit 26 via OR gate 29. No such inhibit signal is generated when either the complemented output of flip-flops 32 and 33 is not a logical 1 or when bit 8 of the program order word is not a logical 1.

The output signals of comparator 31 are alos used in certain situations to modify the displacement address to be used during the next program store read operation. To implement this function a pair of AND gates 35 and 36 which both receive as inputs the output signals from comparator 31 are employed. AND gates 35 and 36 also receive as inputs signals from destination decoders 112 and 212 of data manipulation units 2 and 3, respectively. When destination decoders 112 and 212, in response to a program order word, apply a logical 1 to AND gates 35 and 36 the signal at the output of comparator 31 is applied to an Exclusive-OR gate 37 and an OR gate 38. The outputs of Exclusive-OR gate 37 and OR gate 38 are applied as inputs to bit positions 6 and 0, respectively, of displacement register 25.

Bit position 6 of the present program order word is applied as a second input to Exclusive-OR 37 and bit position 0 of the present program order word is applied as a second input to OR gate 38. Thus, if AND gates 35 and 36 are enabled when the clock signals enable displacement register 25 it receives the logical OR of the outputs of comparator 31 and bit position 0 of the present program order word in bit position 0, and the Exclusive-OR of the bit position 6 of the present program order word and the output of comparator 31 in bit position 6.

On the other hand, if AND gates 35 and 36 are not enabled when the clock signals enable displacement register 25, bit positions 0 and 6 of displacement register 25 receive the outputs of memory 24 at bit positions 0 and 6, respectively. Regardless of whether AND gates 35 and 36 are enabled or not, bit positions 1 through 5 of displacement register 25 receive the outputs of memory 24 at bit positions 1 through 5, respectively, when displacement register 25 is enabled.

If address modification in response to comparator 31 is desired it is necessary that bit 0 of the program order word defining such modification be a logical 0. If this bit position were allowed to be a logical 1 the output signals of comparator 31 could not modify the address to be stored in displacement register 25. In order to implement the operations which define address modification each program order word is checked before the assignment of memory addresses to determine if it defines an address modification operation. If it does, the program order word which is to be next executed when no address modification occurs is assigned a memory address having a logical 0 in bit position 0. The address having a logical 0 in bit position 0 is then stored in bit positions 0 through 5 of the program order word found to define the address modification operation. Operation in the above manner allows the modification of program store addresses based on the outputs of comparator 31.

Peripheral unit 4 can be any type of remotely controlled arrangement which receives control signals via one or more registers. A remote display device is one example of such an arrangement. Peripheral unit 4 includes a plurality of peripheral unit registers of which peripheral unit registers 40 and 41 are shown in FIG. 1. Peripheral unit registers 40 and 41 which are comprised of D flip-flops of the type above described are connected in parallel to selectively receive information from data manipulation unit 2 via a bus 42 and to a selectively transmit information to data manipulation units 2 and 3 via buses 43 and 44, respectively. Buses 42 and 43 are directly connected to data bus 110 of data manipulation unit 2 and bus 44 is directly connected to data bus 210 of data manipulation unit 3. The particular peripheral unit register which is to transmit information to data manipulation unit 2 and 3 is selected by source decoder 111 of data manipulation unit 2 in response to program order words in the same manner that registers internal to that data manipulation unit are selected. The particular peripheral unit register which is to be a destination for data on data bus 110 is selected by destination decoder 112 of data manipulation unit 2 in the same manner as destinations within data manipulation unit 2 are selected.

The following examples illustrate the operation of the disclosed data processing system. In the course of these examples consecutive program order words are denoted "program order word 1", "program order word 2", etc. Similarly, machine cycle portions are referred to as "read 1" and "execute 1" for the memory access of, and operation in accordance with, "program order word 1" and "read 2" and "execute 2" with respect to "program order word 2". In the first example a "program order word 1", which is read from memory 24 during cycle portion "read 1", defines that the contents of general purpose register 106 are to be added to the contents of accumulator 109. "Program order word 1" which is an arithmetic instruction defines that identical operations should be performed by data manipulation units 2 and 3. Thus, with respect to data manipulation unit 2 "program order word 1" defines that the contents of the accumulator 209 and general purpose register 206 are to be added. During the machine cycle portion "execute 1" a parity check is performed by parity check circuit 28 and the predicted parity bit 6 of displacement register 25 is compared with the actual address parity indicated by bit 7 of the instruction. If either of these parity checks fail, clock circuit 26 is inhibited as previously described.

"Program order word 1" is also applied to source decoder 111, destination decoder 112, and arithmetic logic units 108 via the program order word bus 13. Source decoder 111 responds to "program order word 1" by gating the contents of general purpose register 106 onto the data bus 110. Arithmetic logic units 108 respond to "program order word 1" by adding the contents of accumulator 109 to the information on data bus 110 during the "execute 1" portion of the machine cycle. Additionally, destination decoder 112 responds to "program order word 1" by enabling AND gate 122 to apply clock signals to accumulator 109. Similar functions are performed by data manipulation unit 3. Also during "execute 1" comparator 31 compares the information on the data buses 110 and 210 to determine if this information is identical.

When the transition occurs between "execute 1" and "read 2" accumulator 109 responds to the change in clock signals by storing the outputs of arithmetic logic unit 108, which represent the sum of the general purpose register 106 and the accumulator 109. Flip-flops 32 and 33 also respond to the transition from "execute 1" to "read 2" by storing the outputs of comparator 31.

If during the "execute 1" portion the information on data buses 110 and 210 is identical, which it will be unless an error has occurred, flipflops 32 and 33 receive and store a logical 1. This logical 1 has no effect on subsequent machine operations. Alternatively, if the information on data buses 110 and 210 is not identical, comparator 31 generates a logical 0 output which is stored by flip-flops 32 and 33 when the "execute 1" to "read 2" transition occurs. The function of comparator 31 in arithmetic operations is to detect errors and faults in the operation of the data manipulation units 2 and 3. For this reason bit position 8 of "program order word 2" which is read from memory 24 during "read 2" is a logical 1. This logical 1 in bit position 8 is then combined with the complemented outputs of flip-flops 32 and 33 in AND gate 34 during "execute 2" and the clock circuit 26 will be inhibited if flip-flops 32 and 33 are storing the logical 0 indicating a mismatch.

The next example illustrates one operation of the disclosed data processing system in which the data compared by a comparator 31 is generated by data manipulation units 2 and 3 in a nonidentical manner. When nonidentical operation is defined by a given program order word, bit 8 of the immediately subsequent program order word is set to logical 0 since a mismatch detected by comparator 31 may not be an error and consequently the machine should not be inhibited. As previously described the value stored by bit position 8 is determined when the program is being prepared.

In the present example "program order word 1" defines the operation "check accumulator for all zeros". This program order word defines a transfer on condition operation during which data manipulation units 2 and 3 operate in a nonidentical manner. During "read 1" of the present example, "program order word 1" which defines the operation "check accumulator for all zeros" is read from memory 24. For reasons previously described, "program order word 1" includes a displacement address having a 0 least significant bit.

Source decoder 111 of data manipulation unit 2 responds to "program order word 1" by gating the contents of accumulator 109 to data bus 110 during the "execute 1" portion of a machine cycle. The outputs of source decoder 211 of data manipulation unit 3, however, are connected to enable zero generator 246 to apply all 0s to its data bus 210 in response to "program order word 1". Thus the contents of accumulator 109 of data manipulation unit 2 are compared with all 0s from data manipulation unit 3 by comparator 31. Destination decoders 112 and 212 respond to "program order word 1" by enabling AND gates 35 and 36 during the "execute 1" machine cycle.

If accumulator 109 of data manipulation unit 2 is equal to 0 AND gates 35 and 36 transmit the logical 1 output of comparator 31 to Exclusive-OR 37 and OR gate 38. The logical 1 applied to OR gate 38 causes bit position 0 of displacement register 25 to store a logical 1 when it is enabled by the clock signals. Further, the logical 1 applied to Exclusive-OR 37 will complement bit 6 of the present program order word. This complemented bit 6 is also stored by displacement register 25 when it is enabled by the clock signals. On the other hand, if accumulator 109 does not contain all zeros a logical 0 is applied to Exclusive-OR 37 and OR gate 38. This logical 0 will not modify the outputs 0 through 6 of memory 24. The contents of displacement register 25 will then be bit position 0 through 6 of the "program order word 1". The contents of displacement register 25 are then employed as a program store address during "read 2". Thus, if accumulator 109 is not equal to all 0s a displacement address, given by "program order word 1" is employed during "read 2"; however, if accumulator 109 is equal to 0 a modified displacement address is used resulting in a transfer of control. In situations where comparator 31 determines that accumulator 109 does not equal all 0s, flip-flops 32 and 33 will have been set to contain a logical 0. The logical 0 of flipflops 32 and 33 is precluded from inhibiting clock circuit 26 by a logical 0 which was placed in bit position 8 of "program order word 2" in the manner previously described.

Program address register 205 of data manipulation unit 3 is constructed as shown in FIG. 6 so that any information applied to its inputs is applied first to an Exclusive-OR 45. The other input to Exclusive-OR 45 is the information stored by program address register 205. Thus, when program address register 205 of data manipulation unit 3 is an information destination the information actually stored is the Exclusive-OR of the new information and the prior contents of the program address register 205.

Nonidentical operation of data manipulation units 2 and 3 and the circuit arrangement of program addess register 205 of data manipulation unit 3 are used to advantage to determine if the proper address has been placed in program address register 105 and 205. The following example describes the change in contents of program address registers 105 and 205 from an address A to an address B. "Program order word 1" of this sequence gates address B from a selected source to the program address registers 105 and 205 of data manipulation units 2 and 3, respectively. This results in the address B being stored in program address register 105 of data manipulation unit 2 and the Exclusive-OR of addresses A and B being stored in program address register 205 of data manipulation unit 3. "Program order word 2" is retrieved from memory 24 at the combination of address B given by program address register 105 of data manipulation unit 2 and bits 0 through 5 of "program order word 1" obtained from displacement register 25. Data manipulation unit 3 responds to "program order word 2" by gating the data portion of "program order word 2" which is actually address A to its program address register 205. Data manipulation unit 2, however, responds to "program order word 2" by gating the data portion of "program order word 2" onto data bus 110 but no destination is selected for it. When address A is read into program address register 205 it is Exclusive-Ored with the Exclusive-OR of address A and B previously stored in the register. The result of this logical operation is that program address register 205 of data manipulation unit 3 now contains address B. "Program order word 3" then checks the identity of the contents of program address register 105 and 205 by gating their contents to their respective data buses 110 and 210.

What is claimed is:

1. A data processing arrangement comprising:
   a plurality of program controlled data manipulation units arranged to react in nonidentical manners in the execution of certain classes of program order words;
   a memory containing program order words and data;
   means for communicatiing program order words and data from said memory to said data manipulation units;
   a comparison circuit for comparing data produced by said data manipulation units, including data produced in the execution of said certain classes of program order words and for generating match and mismatch signals indicating the identity and lack of identity of said compared data, respectively,
   inhibiting means, connected to said comparison circuit and to said data manipulation units and responsive to said mismatch signals for inhibiting further operation of said data processing arrangement; and
   means coupled to said memory and to said inhibiting means and responsive to program order words obtained from said memory for generating control signals for precluding said inhibiting means for inhibiting the operation of said data processing arrangement.

2. In a data processing arrangement which includes two program controlled data manipulation units, a control unit comprising:
   a memory containing program order words and data;
   means for communicating program order words and data obtained from said memory to both of said data manipulation units;
   means for comparing data produced by said data manipulation units in response to a first program order word and for generating mismatch signals indicating lack of identity of the compared data;
   inhibiting means connected to said means for comparing and to said data manipulation units and responsive to said mismatch signals for inhibiting the further operation of said data processing arrangement; and
   means connected to said memory and to said inhibiting and responsive to a portion of a second program order word obtained from said memory after said first program order word for precluding said mismatch signals from inhibiting further operation of said data processing arrangement.

3. The data processing arrangement of claim 2 wherein said data manipulation units respond to certain of said program order words to produce said data for comparison in a nonidentical manner.

4. The data processing arrangement of claim 3 wherein said control unit further includes storage means for storing an address for use in obtaining program order words from said memory and means responsive to said mismatch signals for modifying the address stored in said storage means.

5. A data processing arrangement comprising:
a first and second program controlled data manipulation unit;
a memory containing program order words and data;
means for communicating program order words and data from said memory to both of said data manipulation units;
a comparator for comparing information produced by said data manipulation units and for generating comparator signals indicating the identity or lack of identity of the compared information;
inhibiting means connected to said comparator and to said first and second data manipulation units and responsive to said comparator signals indicating a lack of identity for inhibiting further operation by said data processing arrangement;
means in said first data manipulation unit responsive to a first program order word for communicating data to said comparator;
means in said second data manipulation unit responsive to said first program order word for communicating a preset constant to said comparator; and
means connected to said memory and to said inhibiting means and responsive to a portion of a second program order word, accessed from said memory after said first program order word for precluding said comparator signals indicating a lack of identity from inhibiting further operation by said data processing arrangement.

6. The data processing arrangement of claim 5 further including storage means for storing an address for use in obtaining program order words from said memory and means responsive to said first program order word for modifying the address stored in said storage means in accordance with said comparator signals indicating identity.

7. The data processing arrangement of claim 6 wherein said storage means further stores a parity bit indicating the parity of the address stored in said storage means, further including means responsive to said first program order word for modifying said parity bit to conform to the modified address stored in said storage means.

8. A data processing arrangement comprising:
a first and a second program controlled data manipulation unit each including a respective one of a first and a second storage resgister;
a memory containing program order words and data;
means for communicating program order words and data from said memory to both of said data manipulation units;
a circuit arrangement associated with said first storage register for generating output signals representing the Exclusive-OR of the contents of said first storage register and data applied to the inputs of said circuit arrangement and for storing said output signals in said first storage register;
means responsive to a first program order word for applying a first data word to the inputs of said circuit arrangement;
means responsive to said first program order word for storing said first data word in said second storage register;
means responsive to a second program order word occurring after said first program order word for applying a second data word to the inputs of said circuit arrangement; and
means responsive to a third program order word comparing the contents of said first and said second storage register to determine if they are identical.

* * * * *